PROTECTIVE CIRCUIT FOR INSULATED GATE METAL OXIDE SEMICONDUCTOR FIELD-EFFECT DEVICE

Original Filed Oct. 8, 1965

INVENTOR.
DONALD E. FARINA
DANIEL R. BORROR
Jack M. Wiseman
ATTORNEY

United States Patent Office

Re. 27,972
Reissued Apr. 16, 1974

27,972

PROTECTIVE CIRCUIT FOR INSULATED GATE METAL OXIDE SEMICONDUCTOR FIELD-EFFECT DEVICE

Daniel R. Borror, Cupertino, and Donald E. Farina, Los Altos, Calif., assignors to General Instrument Corporation, Newark, N.J.

Original No. 3,395,290, dated July 30, 1968, Ser. No. 494,134, Oct. 8, 1965. Application for reissue Oct. 21, 1969, Ser. No. 871,485

Int. Cl. H02h 7/22

U.S. Cl. 317—16 13 Claims

Matter enclosed in heavy brackets [ ] appears in the original patent but forms no part of this reissue specification; matter printed in italics indicates the additions made by reissue.

*ABSTRACT OF THE DISCLOSURE*

*A protective device connected to a line for limiting the voltage on the line to a safe operating range, which protective device comprises a field effect transistor one output terminal of which is connected to a reference potential and the gate and the other output terminal of which are connected to the line.*

The present invention relates in general to semiconductor devices and circuits, and more particularly to a protective device for obviating breakdown or rupture of the gate oxide of an insulated gate metal oxide semiconductor field-effect transistor.

It has been discovered that a relatively high voltage or potential charge impressed across or applied to the gate electrode of an insulated gate field effect Metal Oxide Semiconductor Transistor (MOST) may cause the rupture or breakdown of the gate oxide thereof.

Accordingly, an object of the present invention is to provide a protective device and circuit to eliminate the breakdown or rupture of the gate oxide of a MOST.

Another object of the present invention is to provide a protective device that can be activated to obviate permanent breakdown or rupture of the gate oxide of a MOST.

Another object of the present invention is to provide a device and circuit which protect the gate oxide of a MOST from rupturing or breaking down when the gate oxide is subjected to a relatively high voltage or potential charge.

Other and further objects and advantages of the present invention will be apparent to one skilled in the art from the following description taken in conjunction with the accompanying drawings.

Figure 3:
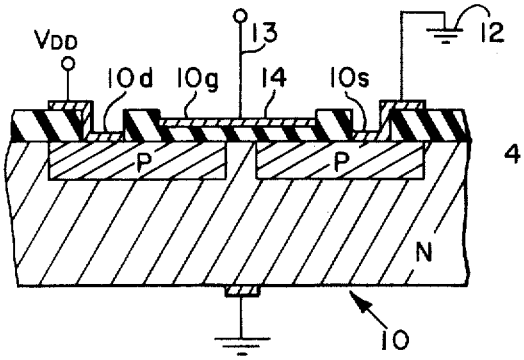
FIG. 3 is a cross-sectional view of the MOST.

Illustrated in FIG. 3 is a conventional MOST 10, which comprises a drain electrode 10d, a source electrode 10s and a gate electrode 10g. Conventionally, an input signal is fed over an input conductor 13 to the gate electrode 10g of the MOST 10.

The gate electrode 10g is formed of aluminum and is disposed over an amorphous quartz (silicon oxide or dioxide) insulating layer 14.

It has been discovered that a relatively high voltage or potential charge impressed across or applied to the gate electrode 10g will cause a rupture of the portion of the insulating layer 14 contiguous with the gate electrode 10g, thereby resulting in a breakdown of the MOST 10. Electrostatic charges of sufficient magnitude to rupture the silicon oxide or dioxide layer 14 can easily be built up due to the high input impedance of MOST 10.

The turn-on voltage ($V_{GST}$) for MOST 10 is proportional to the thickness of the insulating layer 14. This is the voltage (applied between gate electrode 10g and source electrode 10s) which is required to invert the conductivity type of the silicon surface immediately below insulating layer 14 so that conduction by majority carriers between the drain electrode 10d and the source electrode 10s will occur. The field produced by the turn-on voltage is inversely proportional to the thickness of oxide layer 14. As the thickness of layer 14 increases, the required $V_{GST}$ and the rupture voltage of the layer 14 also increase. Hence, there is an optimum thickness for oxide layer 14.

Figure 1:
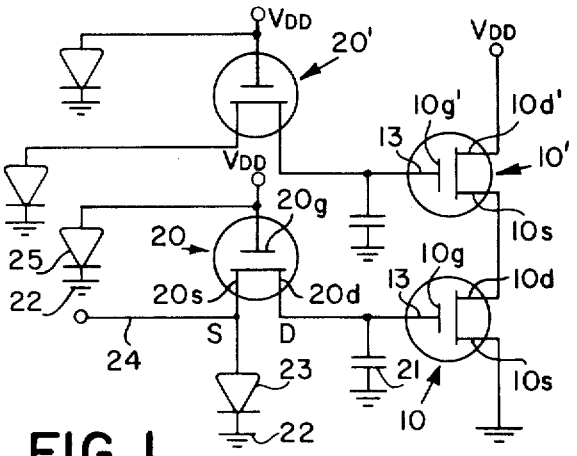
FIG. 1 is a schematic diagram illustrating a MOST and a protective circuit with a MOST employed as a protective device.

FIG. 1 shows a MOST 10 whose source-drain circuit is connected in series with the source-drain circuit of another MOST 10'. Connected to the drain electrode 10d' of MOST 10' is a negative supply source $V_{DD}$. The source electrode 10s of MOST is connected to ground.

A protective MOST 20 has its source-drain circuit connected in series with the gate electrode 10g of MOST 10. A similar protective MOST 20' has its source-drain circuit connected in series with the gate electrode 10g' of MOST 10'. Since MOSTS 20 and 20' are similar in structure and operation, only MOST 20 will be described in detail. Connected from gate electrode 10g to ground is a feed-through capacitor 21, which serves to optimize the gain of the field-effect device 10. Toward this end, the feed-through capacitor 21 has a smaller capacitance to MOST 10.

Figure 4:
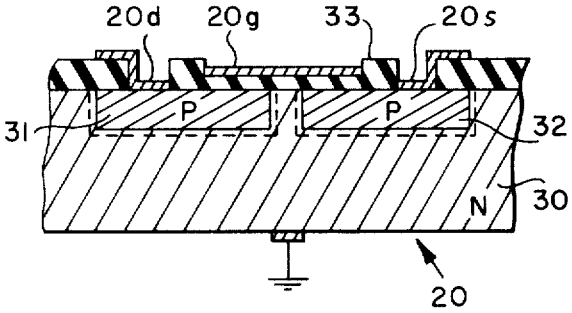
FIG. 4 is a cross-sectional view of a MOST employed as a protective device in FIG. 1.

FIG. 4 shows a cross-sectional view of MOST 20. In FIG. 3 the drain electrode 20d of MOST 20 is connected to the gate electrode 10g of MOST 10. The source electrode 20s of MOST 20 is connected to a ground connection 22 through a diode 23, which is the P-N source to substrate diode of MOST 20. An input signal is impressed on source electrode 20s via a conductor 24. The gate electrode 20g is connected to a source of supply potential $V_{DD}$ or a source of clock synchronizing pulses $V_C$ (not shown). A diode 25 interconnects the gate electrode 20g to ground connection 22. The diode 25 may be formed in the same semiconductor chip or body as is MOST 20; one electrode of the device may be a P-region in the chip which is used for distribution of the supply voltage $V_{DD}$.

From the foregoing, it will be evident that since MOST 20 has its source-to-drain circuit connected in series with the gate electrode 10g of MOST 10, direct contact between the source of input signal (not shown) and the gate electrode 10g is obviated.

When a negative input signal is applied to input terminal 24, the voltage at drain 20d will follow the input voltage since the negative bias on electrode 20g will render MOST 20 conductive from source to drain. If the input voltage reaches the value $V_{DD}-V_{GST}$, where $V_{GST}$ is the gate-to-source threshold voltage of MOST 20, MOST 20 will become nonconductive from source to drain so that if the input voltage rises above $V_{DD}-V_{GST}$, the excess voltage will be dissipated across the source to drain path of MOST 20. Hence, the gate oxide of MOST 10 will be protected against excess input voltage. The voltage fed to the gate electrode 10g will always be less than the supply potential $V_{DD}$, regardless of the magnitude of the input signal fed to input terminal 24.

Since MOST 20 has a measurable source-to-drain resistance when conducting, it forms a resistance capcitance circuit with capacitor 21 and the gate capacitance of MOST 10 for integrating input signals appleid to gate electrode 10g of MOST 10 for reducing input transients.

If clock pulses are applied to gate electrode 20g in lieu of the fixed bias source $V_{DD}$, MOST 20 will conduct intermittently. MOST 10 can thereby be isolated from the input signal except during the sample time or clock time.

The diode 23, which is formed in the semiconductor body 30 of the field-effect device 20, also functions as a secondary protective device. Negative input potentials which are below the breakdown or reach-through voltage thereof, will not cause diode 23 to condut so that a high impedance will exist between the anode and cathode thereof. Input potentials which are equal to or greater than the breakdown or reach-through voltage thereof will cause the diode 23 to conduct, creating a low impedance path between the anode and cathode of the diode 23 so that the source electrode 20s will be clamped to near ground potential. This action prevents the gate oxide 33 of the field-effect device 20 from rupturing. Diode 23 should thus be constructed to break down in response to an input signal which is somewhat less than that required to rupture the gate oxide 33 of MOST 20.

Figure 2:
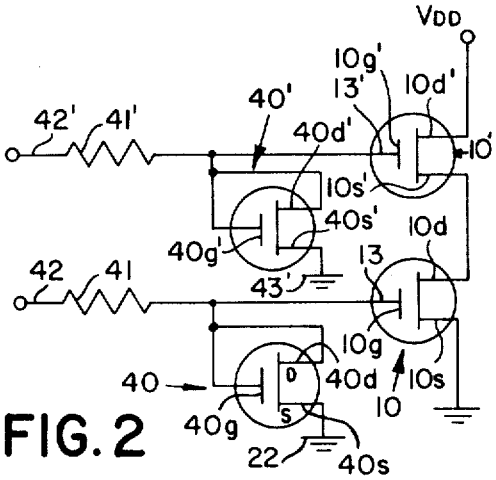
FIG. 2 is a schematic diagram illustrating a MOST and a modified protective circuit with a MOST employed as a protective device.
Figure 5:
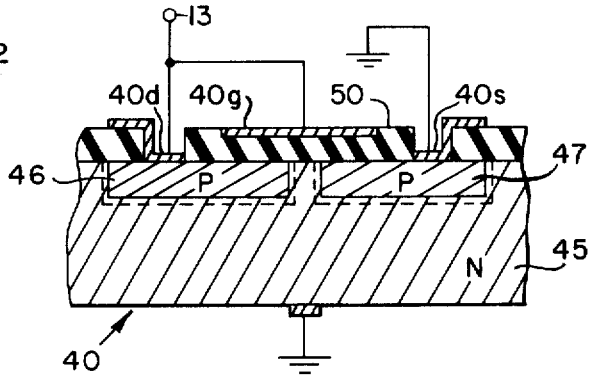
FIG. 5 is a cross-sectional view of a MOST employed as a protective device in FIG. 2.

FIGS. 2 and 5 illustrate the circuit for and the cross-section of a protective MOST 40, which comprises a drain electrode 40d, a source electrode 40s, and a gate electrode 40g. Connected between an input terminal 42 and the gate electrode 10g of a protected MOST 10 and the commonly-connected source and drain of MOST 40 is a dropping resistor 41 and an input conductor 42. The gate electrode 40g and the drain electrode 40d of the field-effect device 40 are connected over a common conductor to the gate electrode 10g of the field-effect device 10. The source electrode 40s is connected to a ground connection 22. The protective MOST 40' for the protected MOST 10' is structurally similar and operates in the same manner as MOST 40. Hence, only MOST 40 will be described in detail.

The gate electrode 40g and the drain electrode 40d of MOST 40 are tied together and are connected to the junction of resistor 41 and the gate electrode 10g of the MOST 10.

According to the present invention, the metal oxide insulating layer 50 under the gate electrode 40g has a greater thickness than conventional MOST's so as to increase the threshold or turn-on voltage of the field-effect device 40.

In operation MOST 40 will not conduct as long as the input signal voltage applied to the input conductor 42 is substantially less than the breakdown or rupture voltage of the gate oxide or gate insulation 14 of MOST 10. Hence, MOST 40 will not substantially influence the operation of MOST 10 under the foregoing conditions.

If the voltage applied to the input conductor 42 tends to increase to a magnitude that is equal to or in excess of the breakdown voltage of the gate insulation 14, MOST 40 will have applied thereto a turn-on voltage or threshold voltage which will cause MOST 40 to conduct from source-to-drain. This provides a low impedance path between the gate electrode 10g of MOST 10 and ground. This limits the potential between gate electrode 10g and source electrode 10s of MOST to a magnitude insufficient to cause a breakdown or rupture of the gate insulation 14. When the voltage applied to input terminal 42 is reduced substantially below the breakdown or rupture voltage of the gate insulation 14, MOST 40 will be restored to its non-conductive or initial state.

It is to be understood that modifications and variations of the embodiments of the invention disclosed herein may be restorted to without departing from the spirit of the invention and the scope of the appended claims.

Having thus described our invention, what we claim as new and desire to protect by Letters Patent is:

1. In combination: a first semiconductor field-effect device having a gate electrode, an adjacent gate insluator, and two further electrodes comprising a source electrode and a drain electrode, a second semiconductor field-effect device similar to said first device, the source-to-drain circuit of said second device being connected in series with said gate electrode of said first device, means for impressing an input signal on one of the further electrodes of said second device for transmission to said gate electrode of said first device, and means connected to said second device for rendering said second device nonconductive so as to reduce the magnitude of said input signal when said input signal exceeds a predetermined value so as to protect said first device against breakdown of its gate insulator.

2. In combination: a first semiconductor field-effect device having a gate electrode, an adjacent gate insulator, and two further electrodes comprising a source electrode and a drain electrode, a second semiconductor field-effect device similar to said first device, the source-to-drain circuit of said second device being connected in series with said gate electrode of said first device, with said drain electrode of said second device being connected to said gate electrode of said first device, means for impressing an input signal on the source electrode of said second device for transmission to said gate electrode of said first device and means connected to said second device for causing said second device to reduce the magnitude of said input signal when said input signal exceeds a predetermined value so as to protect said first device against breakdown of its gate insulator.

3. In combination: a first semiconductor field-effect device having a gate electrode, an adjacent gate insulator, and two further electrodes comprising a source electrode and a drain electrode, a second semiconductor field-effect device comprising a source electrode, a drain electrode, and a gate electrode, said drain electrode of said second device being connected to said gate electrode of said first device, means for impressing a supply potential on said gate electrode of said second device, means for impressing an input signal on the source electrode of said second device for transmission to said first device, and means for causing said second device to conduct in response to said input signal and to become non-conductive if said input signal approaches a value tending to break down the gate insulator of said first device.

4. In combination: a first semiconductor field-effect device having a gate electrode, an adjacent gate insulator, and two further electrodes comprising a source electrode and a drain electrode, a second semiconductor field-effect device having a source electrode, a drain electrode, and a gate electrode, said drain electrode of said second device being connected to said gate electrode of said first device, means for impressing a clock synchronizing pulse signal on said gate electrode of said second device for controlling the conduction of said second device, and means for impressing an input signal on the source electrode of said second device for transmission to said gate electrode.

5. In combination: a first semiconductor field-effect device having a gate electrode, an adjacent gate insulator, and two further electrodes comprising a source electrode and a drain electrode, a second semiconductor field-effect device having a source electrode, a drain electrode, and a gate electrode, said drain electrode of said second device being connected to said gate electrode of said first device, means for impressing a supply potential on said gate electrode of said second device, means for impressing an input signal on the source electrode of said second device for transmission to said first device, whereby said second device will conduct in response to said input signal, so that said input signal will be fed to the gate electrode of said first device without change when said input signal is of a value less than the supply voltage applied to the gate electrode of said second device less the gate threshold voltage of said second device, and when said input signal exceeds the value of the supply voltage applied to the gate electrode of said second device less the gate threshold voltage of said second device, said second device will be rendered nonconductive so that the voltage of said input signal in excess of said value will be dissipated across the source-to-drain circuit of said second device for protecting said first device against breakdown of its gate insulator.

6. In combination: a first semiconductor field-effect device having a gate electrode, an adjacent gate insulator, and two further electrodes comprising a source electrode and a drain electrode, a second semiconductor field-effect device having a source electrode, a drain electrode, and a gate electrode, said drain electrode of said second device being connected to said gate electrode of said first device, means for impressing a clock synchronizing pulse signal on said gate electrode of said second device for controlling the conduction thereof, and means for impressing an input signal on the source electrode of said second device for transmission to said gate electrode of said first device, said second device being arranged to conduct in response to said clock pulse synchronizing signal being on and in response to the input signal applied to the source electrode thereof, said second device while conducting couples said input signal to the gate electrode of said first device and transmits the input signal to the gate electrode of said first device at a reduced magnitude when said input signal exceeds a predetermined value to protect said first device against breakdown of its gate insulator.

7. In combination: a first semiconductor field-effect device having a gate electrode, an adjacent gate insulator, and two further electrodes comprising a source of electrode and a drain electrode, a second semiconductor field-effect device having a source electrode, a drain electrode, and a gate electrode, said drain electrode of said second device being connected to said gate electrode of said first device, means for impressing a potential on said gate electrode of said second device, means for impressing an input signal on the source electrode of said second device whereby for transmission to said first device, said second device will conduct in response to said input signal so that the conduction of said second device will cause an input signal of reduced magnitude to be fed to the gate electrode of said first device when said input signal exceeds a predetermined value to protect said first device against breakdown of its gate insulator, a protective device connected to said source electrode of said second device, and a potential connection connected to said protective device, said protective device being arranged to conduct in response to said input signal being relatively high to connect said potential connection electrically to said source electrode of said second device to protect said second device against breakdown of its gate insulator.

8. In combination: a first semiconductor field-effect device having a gate electrode, an adjacent gate insulator, and two further electrodes comprising a source electrode and a drain electrode, a second semiconductor field-effect device having a source electrode, a drain electrode, and a gate electrode, said drain electrode of said second device being connected to said gate electrode of said first device, means for impressing a supply potential on said gate electrode of said second device, means for impressing an input signal on the source electrode of said second device whereby for transmission to said first device, said second device will conduct in response to the input signal so that the conduction of said second device will allow said input signal to be fed to the gate electrode of said first device without attenuation when the input signal is of a value less than the supply voltage applied to the gate electrode of said second device less the gate threshold voltage, and when said input signal exceeds the value of the supply voltage applied to the gate electrode of said second device less the gate threshold voltage of said second device, said second device will be rendered nonconductive so that the excess voltage of the input signal will be dissipated across the source-to-drain circuit of said second device for protecting said first device against breakdown of its gate insulator, a semiconductor protective device connected to said source electrode of said second device, and a potential connection connected to said protective device, said protective device being arranged to conduct in response to said input signal being relatively high so as to connect said potential connection electrically to said source electrode of said second device to protect said second device against breakdown of its gate insulator.

9. In combination: a first semiconductor field-effect device having a gate electrode, an adjacent gate insulator, and two further electrodes comprising a source electrode and a drain electrode, an input conductor connected to said gate electrode, a second field-effect device having a gate electrode, a drain electrode, and a source electrode, said gate electrode and said drain electrode of said second device being connected to the gate electrode of said first device, a fixed potential point being connected to said source electrode of said second device, said second field-effect device will conduct when a predetermined voltage is supplied to said input conductor, the magnitude of said predetermined voltage being less than the magnitude of the breakdown voltage of said gate insulator of said first device, such that second field-effect device will be non-conductive in response to a potential impressed on said input conductor of a magnitude less than said predetermined voltage and will be conductive in response to a potential impressed on said input conductor of a magnitude greater than said predetermined voltage to electrically connect said potential connection to said gate electrode of said first device so as to clamp said gate electrode of said first device below the breakdown potential of said gate insulator of said first device to protect said first device against breakdown of its gate insulator.

10. In combination: a first semiconductor field-effect device having a gate electrode, an adjacent gate insulator, and two further electrodes comprising a source electrode and a drain electrode, an input conductor connected to said gate electrode, a second field-effect device having a gate electrode, a drain electrode, and a source electrode, said gate electrode and said drain electrode of said second device being connected to the gate electrode of said first device, said second device having a gate insulator adjacent its gate electrode, a potential connection connected to said source electrode of said second device, said second device being constructed to conduct when a predetermined voltage is supplied to said input conductor, the magnitude of said predetermined voltage of said second device being less than the magnitude of the breakdown voltage of said gate insulator of said first device, said second device being non-conductive in response to potential impressed on said input conductor of a magnitude less than said breakdown voltage of said gate insulator of said first device to isolate said potential connection from said gate electrode of said first device and being conductive in response to a potential impressed on said input conductor of a magnitude approaching the gate insulator breakdown voltage of said first device to electrically connect said potential connection to said gate electrode of said first device to clamp said gate electrode of said first device below the breakdown potential of said gate insulator of said first device to protect said first device against breakdown of its gate insulator.

11. In combination: a first semiconductor field-effect device having a gate electrode, an adjacent gate insulator, and two further electrodes comprising a source electrode and a drain electrode, a second semiconductor field-effect device having a source electrode, a drain electrode, and a gate electrode, said drain electrode of said second device being connected to said gate electrode of said first device, means for impressing a clock synchronizing pulse signal on said gate electrode of said second device for controlling the conduction thereof, and means for impressing an input signal on the source electrode of said second device for transmission to said first device, said second device being arranged to conduct in response to said clock pulse synchronizing signal being on and the input signal applied to the source electrode thereof, whereby the conduction of said second device will allow said input signal to be fed to the gate electrode of said first device without attenuation when the input signal is of a value less than the on voltage of the clock synchronizing pulse signal applied to the gate electrode of said second device less the gate threshold voltage of said second device, and when the input signal exceed the value of the on voltage of the clock synchronizing pulse signal applied to the gate electrode of said second device less the gate threshold voltage of the second device, the voltage of the input signal in excess of said value will be dissipated across the source to drain electrode circuit of said second device.

*12. Circuit voltage protection means for limiting the voltage of a circuit to within a permitted voltage range, said protection means comprising:*

*a first field effect transistor having a substrate, a first electrode, a second electrode, and a control element, said second electrode and said control element each being connected to said circuit being protected, and*

*first means providing a voltage to said first electrode,*

*whereby one extreme of said permitted voltage range is established by the voltage provided by said first means, the forward biased conduction from said second electrode to said substrate establishing the other extreme of said permitted voltage range.*

*13. The combination comprising first semiconductor means for limiting the voltage on a first line to an operating range safe for microelectronic components connected to said line, said semiconductor means comprising a control electrode and a second electrode connected to said line, and a third electrode connected to a second line having a first voltage level within said operating range, said second electrode having a junction associated therewith for limiting the voltage on said first line to a second voltage level, said operating range being within the said first and second voltage levels.*

References Cited

The following references, cited by the Examiner, are of record in the patented file of this patent or the original patent.

UNITED STATES PATENTS 3,407,339 10/1968 Booher ---------- 317—33

JAMES D. TRAMMELL, Primary Examiner

U.S. Cl. X.R.

307—203; 317—31, 33 SC, 52, 235 G